W. THOMAS.
Wagon.
No. 23,277.
Patented Mar. 15, 1859.
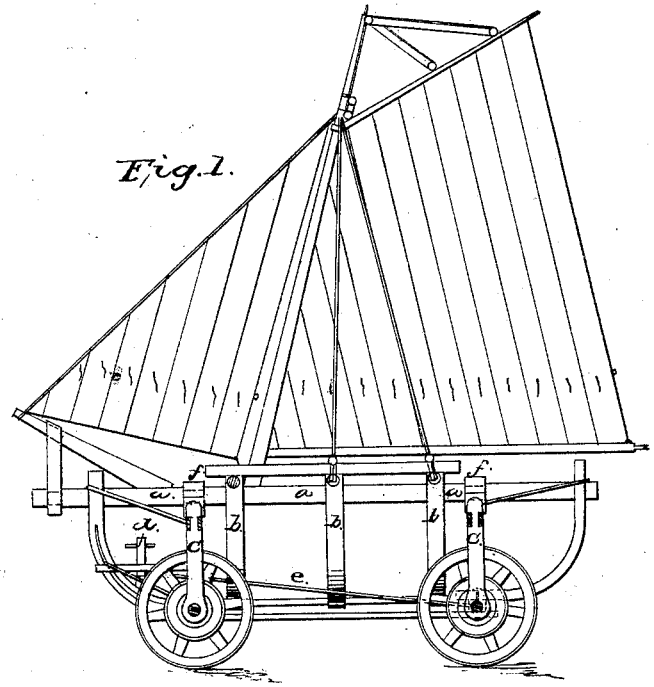
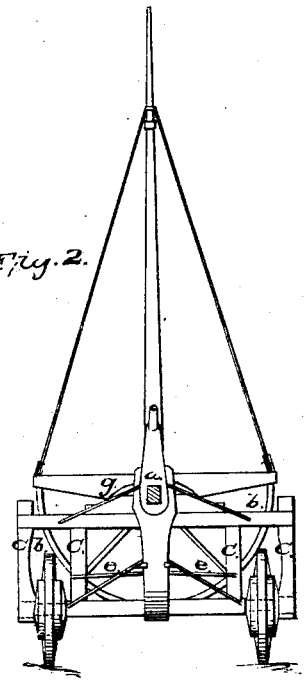
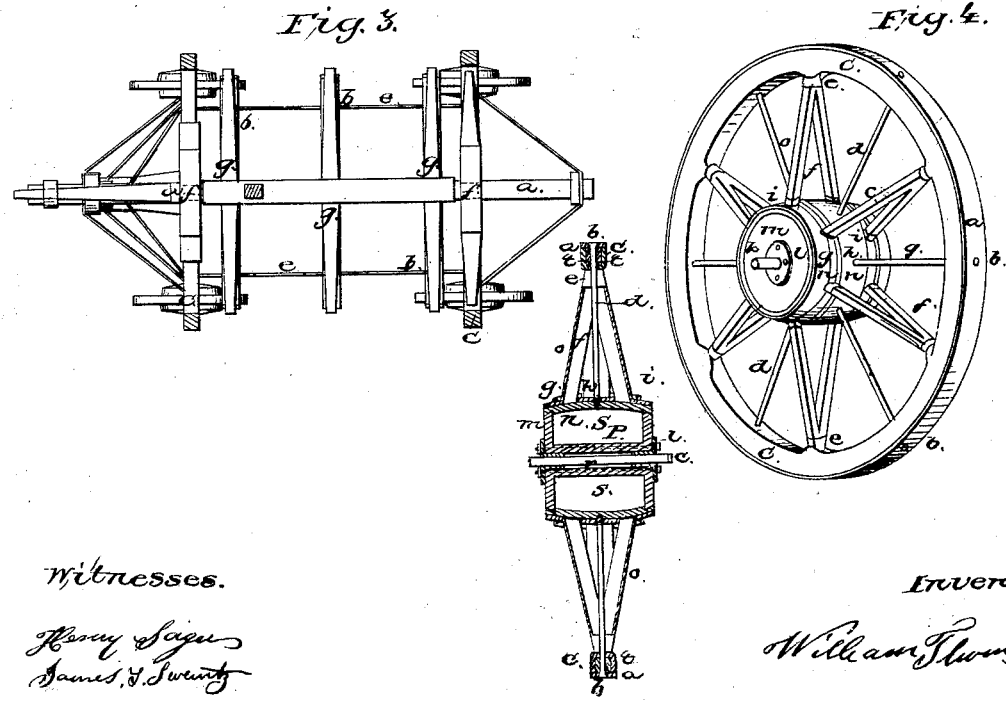
Witnesses.
Henry Sager
James J. Sweeny
Inventor.
William Thomas

UNITED STATES PATENT OFFICE.

WILLIAM THOMAS, OF BENTON COUNTY, ARKANSAS.

SAIL-WAGON.

Specification of Letters Patent No. 23,277, dated March 15, 1859.

*To all whom it may concern:*

Be it known that I, WILLIAM THOMAS, of the county of Benton and State of Arkansas, have invented a new and useful Improvement in Wind-Wagons for Transportation by Land; and I do hereby declare that the following is a full, clear, and exact description of the construction and operation of the same, reference being had to the annexed drawings, making a part of this specification, in which—

Figure 1 is a longitudinal elevation, Fig. 2 a front elevation, and Fig. 3 a plan of the wagon and appendages; and Fig. 4 a perspective view and cross-section of a wheel of the same.

*Description of the wagon as represented in Figs. 1, 2 and 3.*—The frame $b$ $b$ $b$ of the cargo-box, is attached by means of the cross-beams $g$ firmly to the longitudinal rocking-shaft $a$, which carries also the spars for spreading canvas; the whole resting, at the journals $f$ $f$, on the axle frames $c$ $c$, and being free to vibrate in a lateral or athwartship direction. The axle frames are constructed in such a manner as to support the axles on each side of the wheel, as at $c$, $c$, Fig. 2; and the hinder frame is geared with a through king-bolt, in the usual manner, to secure rotary motion. To this frame the tiller-ropes $e$ are attached, and connect with the pilot wheel and shaft $d$, thus completing the apparatus for steerage.

*Description of the wheel as shown in Fig. 4.*—The wheels are intended to carry in themselves part of the freightage of the structure, and are made up of the tire $a$, pierced and countersunk at proper intervals to fit the suspension rods $d$;—the felly $t$, and its metallic casing $c$;—the iron end bands $g$, of the hub, which are turned up at the required points in a narrow covering plate $o$ which traverses the outer side of the splayed spokes $f$, the lower angle being secured by the adjustable stirrup $i$ which enclasps both the plate and the spoke. The upper ends of these spoke-plates and the spokes themselves are bound with the ferrule $e$.

$h$ is the middle band of the hub. Into this the suspension rods are screwed, piercing a short distance into the arched side or shell, $n$, of the barrel-hub; and, between this and the end bands, the central extremities of the spokes pass into a shallow mortise formed also in the shell $n$.

$m$ is the head, and $s$ the cavity or stowage room of the barrel-hub.

$l$, $l$, represent the iron axle-boxes with their flanges spread on the face of the hub. They are secured by screw-bolts passing through a beveled-ended inner axle casing $p$, which serves as a floor to the wheel-cargo, and leaves the space, $r$, to be used as an oil chamber. A man-hole, with the usual fittings, is made in the head of this barrel-hub through which to receive and discharge the wheel freight.

*Operation.*—The nature and working of this machine will be obvious on reference to the claim and specification.

I do not claim the application of sails and steering apparatus to vehicles for transportation by land; neither do I claim the splayed spokes and suspension rods used in the strengthening of the wheel; they are well known. But

I claim—

1. The combination of the spars and cargo-box on the rocking shaft $a$, thus lowering the center of gravity, and increasing the stability of the fabric,—not only in this way, but by also, and as another effect thereof, allowing the sails to yield to violent gusts of thwart wind, receiving their force gradually, and spilling it more and more as they decline.

2. I claim the invention of the hollow wheel-hub, which I have called the barrel-hub, to be used for purposes of freight, thereby relieving the axle, avoiding friction, and adding to the power of the vehicle to stand up safely against strong cross-winds; the various parts being arranged in the manner and for the purposes substantially as set forth and described.

WILLIAM THOMAS. [L. S.]

Witnesses:
HENRY SAGER,
JAMES T. SWARTZ.